Oct. 22, 1963  A. F. BUJAN  3,107,745
SPRING SCALE
Filed Nov. 16, 1961
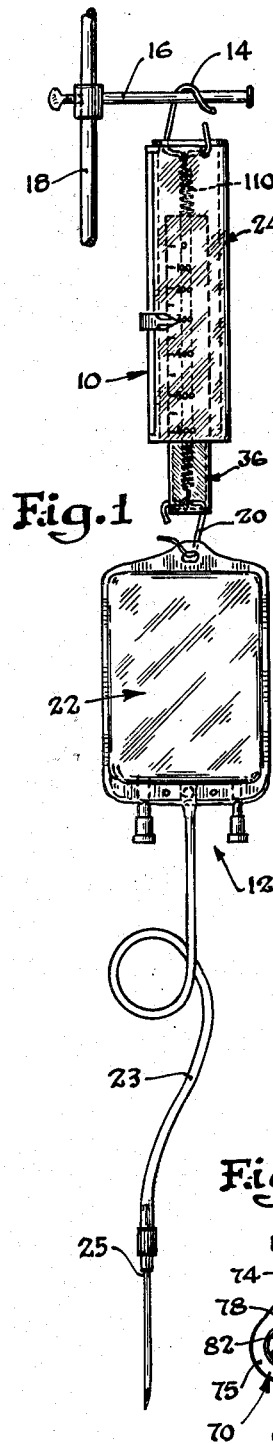
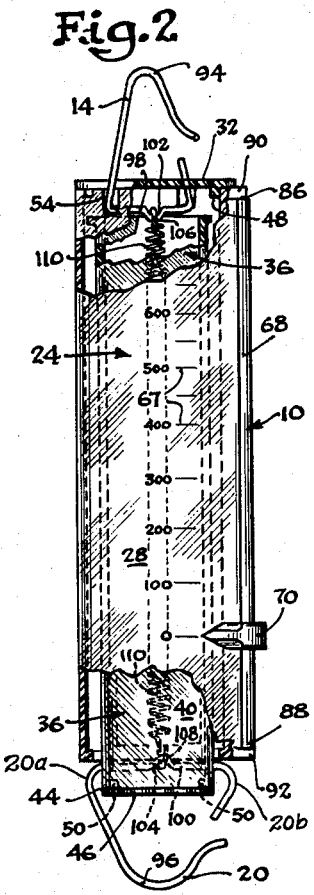
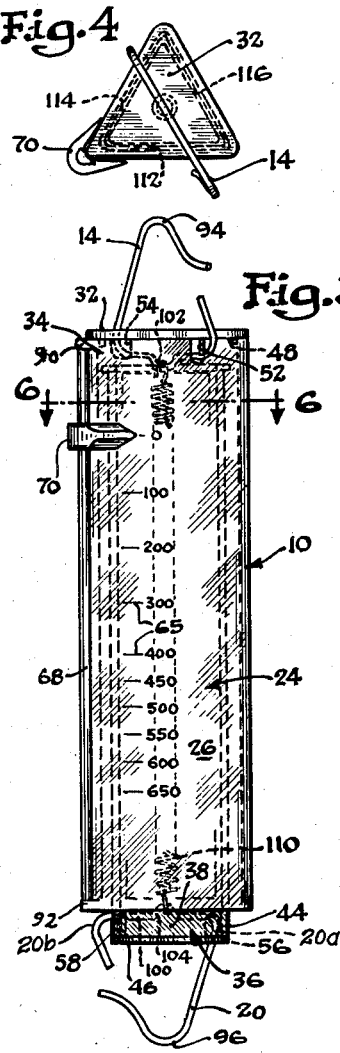
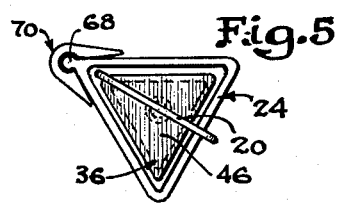
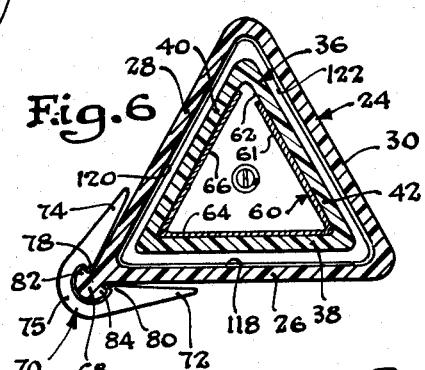
Inventor
Albert F. Bujan
Joseph J. Grass
Attorney
By

3,107,745
SPRING SCALE

Albert F. Bujan, Waukegan, Ill., assignor to Abbott Laboratories, North Chicago, Ill., a corporation of Illinois
Filed Nov. 16, 1961, Ser. No. 152,884
10 Claims. (Cl. 177—233)

This invention relates to a spring scale and in particular to a spring scale that is especially adapted for use in the collection of blood and the administration of blood and solutions. The spring scale of the invention is for example employable to measure either the amount of solution or blood administered to or the amount of liquid, for example blood which is collected from a patient. The spring scale of the invention is not to be considered to be limited to these uses.

As one of the features of the invention, there is provided a pair of opposed scales having graduations which on the one scale are of ascending magnitude while those on the other scale are of descending magnitude with respect to one longitudinal direction. An indicator is employed to indicate a reading on a selected one of the scales. The indicator is movable with respect to the scales so that when administration equipment ready for use is hooked to the spring scale, the indicator can be calibrated to the zero reading on the administration scale and a reading can be obtained easily and efficiently as the solution is being administered. On the other hand, when for example blood is being collected from a donor, the blood collection equipment is hooked to the spring scale and the indicator is set at the zero reading on the collection scale. As blood enters the blood collection equipment, a reading is easily obtained by viewing the blood collection scale. It is apparent that the indicator is of a character to be calibrated to a zero reading on each of the adjacent scales.

Another feature of the spring scale of the invention is that its elongated tubular body and its elongated member which slides therein are both composed of transparent material so that the scales in the elongated member can be quickly and easily read.

Another feature of the invention is that a first bail is provided which has the dual function of providing a hanger of the spring scale and of mounting one terminal end of a tension spring employed in the spring scale. A second bail has a triple function of engaging a load, of mounting an opposed terminal end of the spring, and of providing a stop for the elongated member with respect to the elongated tubular body. Both the first and second bails are provided with hook portions which engage a supporting member and a load, respectively. In addition, the first and second bails are each provided with a spring mounting portion which has an inwardly bent portion into each of which a terminal end of the spring is nested. The reasons for providing inwardly bent portions on the first and second bails are that the spring will cause the first and second bails to assume normally extended positions and also the spring will be centered within the elongated member. It is therefore apparent that the first bail is easily connected to a supporting member or the like and that the second bail is easily connected to a load.

The invention having been generally described, reference is now made to the accompanying diagrammatic drawing in which:

FIGURE 1 is a diagrammatic view of the spring scale of the invention shown in an environment with equipment with which it is particularly useful;

FIGURE 2 is a side elevation view, partly cut away, and partly in cross-section of one side of the spring scale of the invention;

FIGURE 3 is a side elevation view of another side of the spring scale of the invention;

FIGURE 4 is a plan view of the spring scale of the invention;

FIGURE 5 is a bottom view of the spring scale of the invention; and

FIGURE 6 is a cross-sectional view taken along line 6—6 of FIGURE 3.

Referring now to FIGURE 1 of the illustrative drawing, there is shown a spring scale generally indicated at 10 particularly adapted for weighing, for example, either a solution or blood to be administered or for example, blood to be collected from conventional equipment, generally indicated at 12. The spring scale 10 has a first bail 14 which is adapted to be hooked around for example a supporting member 16 which is adjustably connected to a standard 18. The spring scale 10 has an opposed second bail 20 which is adapted to engage for example, a container 22 of the equipment 12. A length of tubing 23 is connected at one end to the container 22 and at the other end to an intravenous needle 25.

Referring now to FIGURES 2 through 6 of the illustrative drawing, the spring scale 10 is shown to have an elongated tubular body 24 which is shown to be composed of a transparent material. The elongated tubular body 24 has a polygonal cross-section as best shown in FIGURES 4, 5 and 6 where it is shown to take the cross-sectional form of a generally isosceles triangle having sides 26, 28, and 30. End plate 32 is secured, for example by chemical or thermal sealing, to the upper terminal end 34 of the elongated tubular body 24. An elongated tubular member 36 is disposed within the elongated tubular body 24 and is adapted for relative longitudinal travel therein. The elongated tubular member 36 is of polygonal cross-section best shown in FIGURE 3 which corresponds to the polygonal cross-section of the elongated tubular body 24 shown to be in the form of a generally isosceles triangle having sides 38, 40 and 42. The elongated tubular member 36 is also shown to be composed of a transparent material. The lower terminal end 44 of the elongated tubular member 36 is provided with an end plate 46. Both the end plate 32 and the end plate 46 are provided with flanges 48 and 50, respectively, which are spaced slightly inwardly of the peripheral edges thereof a distance which corresponds to the thickness of the sides 26, 28 and 30 of the elongated tubular body 24. The bail 14 is positioned in cutout portions or apertures 52 and 54 in the sides 26 and 28, respectively. The end plate 32 serves to close the open side of the cutout portions or apertures 52 and 54. In like manner, the elongated tubular member 36 is provided with cutout portions or apertures 56 and 58 which are formed in the side 38 and at the intersection of sides 40 and 42, respectively. The end plate 46 closes off the open end of the cutout portions 56 and 58.

A one-piece printed, paper scale assembly 60 is secured, for example by an adhesive, to an inner surface 62 of the elongated tubular member 36.

The scale assembly 60 contains an administration scale 64 and a collection scale 66 which are secured to sides 38 and 40, respectively. The administration scale 64 for example is arranged to provide a reading during the administration of a solution, while the collection scale 66 is arranged to provide a reading during collection of for example blood. The marginal portion 61 of the scale assembly 60 disposed along side 42 is preferably reserved for instructions as to the use of the scale or for advertising matter. The scale 64 is provided with graduations 65 which ascend in magnitude, while the scale 66 has graduations 67 which descend in magnitude, when read from the top to the bottom.

The elongated tubular body 24 and the elongated tubular member 36 are both preferably generally isosceles triangles in cross-section to facilitate the viewing of scales 64 and 66. The cross-sectional form can have more than three sides, if desired. The term "polygonal" as used herein is intended to include a cross-sectional form having three or more sides.

An undercut slide 68 is provided at the intersection of the sides 26 and 28 of the elongated tubular body 24. The slide 68 mounts an indicator 70 which comprises a pair of indicator portions 72 and 74. The indicator portion 72 points to the scale 64 and the indicator portion 74 points to the scale 66. The indicator portions 72 and 74 are joined by a bight portion 75 having opposed grips 78 and 80 which engage undercut surfaces 82 and 84 of the slide 68. The indicator 70 is composed of a resilient, preferably opaque material which due to the resiliency of the material itself is frictionally held in a selected position on the slide 68 relative to the scales 64 and 66. The ends 86 and 88 of the slide 68 are provided with stops 90 and 92 which limit the sliding movement of the indicator 70. In assembling, the indicator 70 is simply snapped over the slide 68.

The bail 14 and the bail 20 have hook portions 94 and 96 and spring mounting portions 98 and 100, respectively. The spring mounting portions 98 and 100 are each provided with centrally disposed inwardly bent portions 102 and 104 into which terminal ends 106 and 108 of a spring 110 are respectively nested. The inwardly bent portions 102 and 104 maintain the spring 110 centered within the elongated tubular member 36, and at the same time under the action of the spring 110 the inwardly bent portions 102 and 104 serve to maintain the bails 14 and 20, respectively, in normally extended positions.

In order to limit the travel of the elongated tubular member 36 in the one direction, the sides 38, 40 and 42 thereof are provided with outwardly projecting flanges 112 and 114 and 116 which engage opposite internally extending flanges 118, 120 and 122 of the sides 26, 28 and 30 of the elongated tubular body 24. Since the spring mounting portion 100 of the bail 20 extends transversely through the apertures 56 and 58 and beyond the outer surface of the elongated member 36, the spring mounting portion 100 serves, upon abutment with the end of the tubular body 24, to limit the travel of the elongated member 36 in the other direction. The bail 20 has spaced outwardly extending portions 20a and 20b, engageable with the outer surface of the elongated member 36, which limit the transverse movement of the spring mounting portion 100. The outwardly extending portion 20a is shown to terminate in the hook portion 96.

Although the elongated tubular body 24 is preferably composed of a transparent material, if desired, it can alternatively be composed of an opaque material and be provided with an elongated slot in each of the sides 26 and 28 to expose the administration scale 64 and the collection scale 66, respectively. Similarly, if desired, the elongated member 36 can be composed of an opaque material and a scale assembly can be secured to or printing on the outer surface of the sides 38, 40 and 42.

The above-described embodiment being exemplary only, it will be understood that the invention comprehends modifications in form or detail from the presently described embodiment. Accordingly, the invention is not to be considered as limited save as is consonant with the scope of the following claims.

What is claimed is:

1. A spring scale comprising an elongated tubular body having a polygonal cross-section, an elongated member having a corresponding polygonal cross-section and mounted for travel within said elongated tubular body, a spring connecting said elongated tubular body and said elongated member, a first scale disposed along one side of said elongated polygonal member, a second scale disposed along another side of said elongated polygonal member, means for indicating a reading on a selected one of said scales, and means for frictionally mounting said indicating means for slidable movement relative said first and second scales.

2. The invention defined in claim 1 wherein said elongated body and said elongated member are each composed of a transparent material.

3. The invention defined in claim 1, including means for limiting the sliding movement of said indicating means.

4. The invention defined in claim 1, including means for limiting the travel of said elongated polygonal member within said elongated polygonal body.

5. In a spring scale, an elongated tubular body having a polygonal cross-section and being composed of a transparent material, and an elongated tubular member having a corresponding polygonal cross-section and composed of a transparent material and mounted for travel within said tubular body, a first scale mounted on the inner surface of one of the sides of said polygonal tubular member, a second scale mounted on the inner surface of another side of said polygonal tubular member, means for indicating a reading on a selected one of said scales, and means for frictionally mounting said indicating means for slidable movement relative to said first and second scales.

6. In a spring scale, an elongated tubular body, an elongated tubular member mounted for travel within said tubular body, said elongated tubular member having an outer surface, a first bail passing through one end of said tubular body for supporting said spring scale, a second bail opposite said first bail and extending transversely through a marginal end of said elongated tubular member, a tension spring connected at one terminal end to said first bail and at the other terminal end to said second bail, said second bail extending transversely through apertures in and beyond said outer surface of said elongated tubular member for providing a stop against the other end of said tubular body, said second bail having spaced outwardly extending portions engageable with the outer surface of said elongated tubular member for limiting the transverse movement of said second bail, one of said outwardly extending portions terminating in a hook portion.

7. In a spring scale, an elongated tubular body, an elongated member mounted for travel within said elongated tubular body, a first scale having one form of graduations, an adjacent second scale angularly disposed with respect to said first scale and having another form of graduations, an indicator having two indicating portions, one of said indicating portions being provided to obtain a reading from said first scale and the other of said indicating portions being provided to obtain a reading from said second scale, and means for adjustably mounting said indicating means on said elongated tubular body for slidable movement relative to said first and second scales, whereby said indicating means is calibratable alternately to one of said first and second scales.

8. In a spring scale, an elongated tubular body, an elongated member mounted for travel within said elongated tubular body, a first scale having graduations of ascending magnitude in one longitudinal direction, an adjacent second scale having graduations of descending magnitude extending in the same longitudinal direction, means for indicating a reading on a selected one of said scales, and means for adjustably mounting said indicating means on said elongated tubular body for slidable movement relative to said first and second scales, whereby said indicating means is calibratable alternately to one of said first and said second scales.

9. In a spring scale, an elongated tubular body, an elongated tubular member mounted for travel in said tubular body, a first bail having a hook portion adapted to engage a supporting member and a spring mounting portion extending through said elongated body, a second bail opposite said first bail and having a hook portion adapted to engage a load and a spring mounting portion extending through a marginal end of said elongated tubular member, each of said spring mounting portions having an inwardly bent portion, and a tension spring having opposed terminal ends nested in said inwardly bent portions of said first and second bails, respectively, said inversely bent portions serving to maintain said hook portion of each of said bails in normally extended positions under the action of said spring.

10. In a spring scale, an elongated tubular body, an elongated member mounted for travel within said tubular body, a first bail connected to said elongated tubular body, said first bail having a hook portion adapted to engage a supporting member and having a spring mounting portion, a second bail connected to said elongated member and disposed opposite said first bail, said second bail having a hook portion and a spring mounting portion, and a tension spring having opposed ends connected to said spring mounting portions of said first and second bails, respectively, at least one of said mounting portions having an inwardly bent portion in which one end of said tension spring is nested, said inwardly bent portion serving to maintain its respective hook portion in a normally outwardly extending position under the action of said tension spring.

References Cited in the file of this patent

UNITED STATES PATENTS

| | | |
|---|---|---|
| 1,141,562 | Law | June 1, 1915 |
| 2,074,628 | Tatum | Mar. 23, 1937 |
| 2,649,299 | Murphy | Aug. 18, 1953 |